United States Patent [19]
Wilson

[11] Patent Number: 5,864,827
[45] Date of Patent: Jan. 26, 1999

[54] SYSTEM AND METHOD FOR PROVIDING AN INFORMATION GATEWAY

[75] Inventor: Donald W. Wilson, Toronto, Canada

[73] Assignee: Belzberg Financial Markets & News International Inc., Toronto, Canada

[21] Appl. No.: 883,739

[22] Filed: Jun. 27, 1997

[51] Int. Cl.[6] .................................................. G06F 17/00
[52] U.S. Cl. ...................... 705/35; 345/329; 395/200.48; 395/700.47
[58] Field of Search .................................. 705/1, 10, 35, 705/36, 37, 39; 345/329, 331, 335; 395/200.3, 200.33, 200.47, 200.48, 200.49, 200.57, 200.61

[56] References Cited

U.S. PATENT DOCUMENTS 5,684,799   11/1997   Bigham et al. ........................ 370/397

*Primary Examiner*—Thomas Peeso
*Attorney, Agent, or Firm*—Kenyon & Kenyon

[57] ABSTRACT

In a device and method to provide a gateway for the transfer of information between financial markets and customers, a processor is coupled to a customer system and to a financial market system. The processor receives transaction information from the customer system in a first format, converts it to a second format and transmits the transaction information to the financial market system. The processor receives an acknowledgment and a transaction confirmation from the financial market system in the second format, converts these to the first format and transmits the acknowledgment and the transaction confirmation to the customer system. The processor may also be coupled to a memory, where it stores tracking information relating to the transaction information, the acknowledgment and/or the transaction confirmation.

64 Claims, 4 Drawing Sheets

CUSTOMER SYSTEM X

| TRANSACTION NO. | SYMBOL | TRANSACTION TYPE | QUANTITY | ASK PRICE | EXCHANGE | ACKNOWL. | CONFIRM. | STATUS | # TRADED | # REMAINING | TRADE PRICE |
|---|---|---|---|---|---|---|---|---|---|---|---|
| 1 | XYZ | BUY | 100K | $17 | NYSE | YES | YES | FILLED | 100K | 0 | $17 |
| 2 | ABC | SELL | 200K | $42 | TSE | YES | YES | PARTIAL FILL | 150K | 50K | $42 |
| 3 | LMN | BUY | 1K | LAST | OPTIONS | YES | NO | | | | |

FIG. 3

SYSTEM AND METHOD FOR PROVIDING AN INFORMATION GATEWAY

FIELD OF INVENTION

The present invention is directed to a system and method for providing a gateway for the transfer of information between financial markets (exchanges) and customers. More specifically, the present invention is directed to a system and method for providing a gateway for the transfer of information between one or more customer system(s) which utilize a common protocol and one or more financial market (exchange) system(s) which utilize the same and/or different protocols that differ from the common protocol.

BACKGROUND OF THE INVENTION

To transfer information between two systems, i.e., a customer system and a financial market (exchange) system, that utilize different protocols or languages, it is necessary to manually extract the raw data from the one system and manually enter that data into the other system. Trading interface systems implemented by brokerages utilize such a dual system. One system is used to communicate on the client side for receiving transaction information, e.g., orders, and transmitting transaction information, e.g., acknowledgments, confirmations and historical data. The other system is used to communicate on the market (exchange) side to transmit transaction information, e.g., place orders, and to receive transaction information, e.g., acknowledgments and confirmations.

The current methodology or manual system requires duplication of information entry. Currently, customers who wish to trade (buy and/or sell) financial instruments (i.e., securities, stocks, bonds), currencies, commodities, REITs, options, futures, etc., on financial markets (exchanges) must either communicate directly, e.g., by telephone, with a broker to place an order or be connected to a broker electronically, for example, via computer or terminal. Upon receipt of an order the broker must manually enter the order information for transfer to and execution by the relevant financial market (exchange), e.g., NYSE, NASDAQ, TSE, CBOE, etc.

Once an acknowledgment is received from the relevant financial market (exchange), the broker must then either manually reenter that information for transmission to the customer's computer or terminal, or call the customer and indicate that acknowledgment of the order was received from the relevant financial market (exchange). Upon receipt by the broker of a message from the relevant financial market (exchange) confirming execution, partial execution or non-execution of the order, the broker must then once again either manually reenter that information for transmission to the customer's computer or terminal, or call the customer and indicate that the order was either executed, partially executed or not executed by the relevant financial market (exchange).

Additionally, there are currently markets such as the bond market where trading is not implemented electronically, i.e., there are no computer or other systems linking brokers to their clients or to any markets (exchanges). Thus, in these situations all information must be transferred orally and recorded manually both between the customer and broker and between the broker and the market (exchange).

When using a computer or terminal to communicate between a customer system and a broker system when executing transactions in the equities markets (on the equities exchanges), there is a protocol, the Financial Information Exchange (FIX) that has been accepted and implemented by many brokerage houses as a common, standard protocol for all electronic transfers of transaction information. All electronic communications between customers and brokers are formatted according to the FIX protocol.

However, in the equities markets, the various exchanges each utilize proprietary protocols governing communications between the exchange and brokers who are electronically connected to and who transact business on the exchange. For example, the New York Stock Exchange (NYSE) uses the Common Message Switch (CMS) format, while the Toronto Stock Exchange (TSE) uses the Securities Trading Access Message Protocol (STAMP) format.

Thus, any broker wishing to transmit transaction information, e.g., send a customer's order, to an exchange must take the order received from the customer (i.e., in FIX protocol) and reenter it into the broker's system which interfaces with the relevant exchange (using a different protocol), thereby allowing the order to be understood by the exchange's system.

This is a difficult and time consuming process which is prone to errors since the same information must be manually entered by an operator twice for a transaction to be processed.

There is a need for a system and method whereby a broker can receive transaction information from a customer electronically, e.g., via computer or terminal, and transfer that transaction information electronically to a financial market (exchange) without having to manually reenter the transaction information. Additionally, there is a need for a system and method whereby a broker can receive transaction information, e.g., an acknowledgment and/or a confirmation, from a market (exchange) and transfer that transaction information electronically to a customer, e.g., via computer or terminal, without having to manually reenter the transaction information.

Furthermore, there a need for a system and method whereby a broker can automatically translate transaction information received electronically from a customer in a certain protocol or language into a protocol or language compatible with the system used by the market (exchange) to which the transaction information is transmitted, and vice versa.

SUMMARY OF THE INVENTION

The present invention alleviates these difficulties and solves these problems with a system and method for providing a gateway for the transfer of information between one or more customer system(s) which all utilize a common protocol and one or more financial market (exchange) system(s) which each utilize the same and/or different protocols that differ from the common protocol used by the customer system(s).

The present invention also provides for a system and method whereby a broker can receive transaction information from a customer placed electronically, for example, via computer or terminal, and transmit the transaction information electronically to a financial market (exchange) without the need to manually reenter the transaction information. Additionally, the present invention provides for a system and method whereby a broker can receive transaction information, for example, an acknowledgment and/or a confirmation, electronically from a market (exchange) and transmit that transaction information electronically to a customer, for example, via computer or terminal, without the need to manually reenter the transaction information.

Furthermore, the present invention provides a system and method whereby a broker can automatically translate transaction information received electronically from a customer in a certain protocol or language into a protocol or language compatible with a system used by a financial market (exchange) to which the transaction information is transmitted, and vice versa.

The system according to the present invention includes a gateway which receives and transmits transaction information from/to at least one customer system, receives and transmits transaction information from/to a plurality of markets (exchanges), and translates transaction information from a first protocol, i.e., format and/or language, into at least a second protocol and vice versa.

More specifically, the system according to the present invention includes a gateway which receives transaction information from and transmits transaction information to one or more systems, for example, located at one or more customers and/or one or more brokers, and from/to one or more systems, for example, located at one or more financial markets (exchanges). The transaction information may be transmitted and received by the gateway, by the customer and/or by the financial market (exchange) electronically, or some other way such as via an optical link. Customers and brokers are coupled to the gateway via a customer/gateway interface and financial markets (exchanges) are coupled to the gateway via an exchange/gateway interface.

Transaction information may be entered and/or formatted in any number of different ways, including, for example, in spreadsheet format as a single transaction or a number of transactions, as discrete groups or blocks of information, or directly as individual or single transactions.

The gateway may include components such as, for example, one or more microprocessors, one or more memories, one or more storage devices and one or more I/O devices.

The gateway receives the transaction information and processes the information. The processing may include, for example, separating the information corresponding to each respective transaction, identifying each transaction, formatting the transaction information, and/or translating, i.e., converting or modifying, the information from a protocol, i.e., language and/or format used by the customer/gateway interface into one or more protocols, i.e., languages and/or formats used by the exchange/gateway interface, and vice versa. The gateway may also create a data base including transaction information, store transaction information in memory and/or send transaction information to a storage device.

The present invention may be implemented using any operating system, including, but not limited to Windows NT, Windows 95, UNIX, MAC, etc.

BRIEF DESCRIPTION OF THE DRAWINGS

FIG. 3 is a diagram of a format for tracking data stored in memory as a data base according to a first embodiment of the present invention.

DETAILED DESCRIPTION

Figure 1:
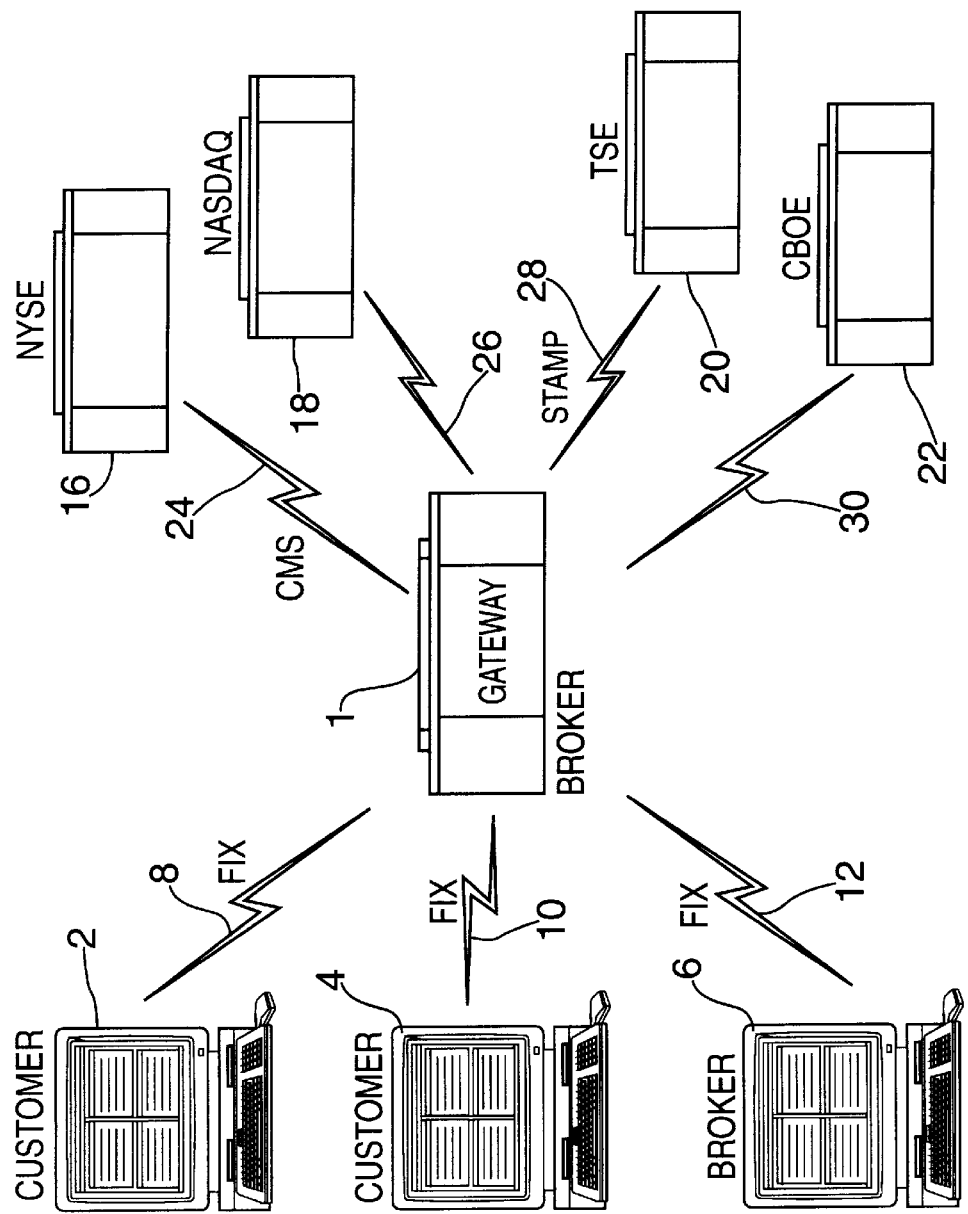
FIG. 1 is a system diagram according to a preferred embodiment of the present invention showing customer/gateway and exchange/gateway interfaces.

Referring now to the drawings, and initially FIG. 1, there is illustrated a system diagram according to a first embodiment of the present invention. A gateway 1 which may be located, for example, at a broker's facility, can be implemented using, for example, server class PC, a mainframe computer, a microcomputer, or some other type of processing system. The gateway 1 is coupled to one or more customer system 2, which may be, for example, a microcomputer, mainframe computer or some other type of processing system where a customer may place orders or transact business, via a customer/gateway interface 8 which may include some form of communications link using, for example, electronic or optical transmission of data, and which may be, for example, a modem connection over a telephone line, LAN, WAN, Intranet, Internet, dedicated line, satellite link, optical link or some other type of connection. The gateway 1 may additionally be coupled to other customer system(s) 4 via additional customer/gateway interfaces 10, and/or to broker system(s) 6, e.g., terminal(s) and/or computers, which may be located, for example, at the broker's facility or affiliated facilities, via other customer/gateway interfaces 12, e.g., modem connection over a telephone line, LAN, WAN, dedicated line, satellite link, optical link or some other type of connection. The broker system(s) can be used, for example, on trading desks or by sales people at the broker's facility for placing customer telephone orders or trades for in-house accounts such as mutual funds or hedge funds or for the broker's own account.

All communications between the gateway 1 and the customer systems 2, 4 and/or the broker system(s) 6 occur using a common protocol (format and/or language), for example, Financial Information Exchange (FIX) protocol, which is in the public domain, commonly known and used as a universal trader protocol, and is described in detail in for example, the FIX 4.0 specification and release notes issued by the Fix Technical Committee, Jan. 13, 1996, and available at www.Fixprotocol.org which is incorporated herein by reference.

The gateway 1 is also coupled to one or more financial exchanges 16, 18, 20, 22, for example, NYSE 16, NASDAQ 18, TSE 20, CBOE 22, which may be, for example, a microcomputer, mainframe computer or some other type of processing system, where the exchange may receive and process orders, via an exchange/gateway interface 24, 26, 28, 30 which may include some form of communications link using, for example, electronic or optical transmission of data, and which may be, for example, a modem connection over a telephone line, LAN, WAN, dedicated line, satellite link, optical link or some other type of connection.

The communications between the gateway 1 and each exchange 16, 18, 20, 22 occurs using a proprietary protocol (format and/or language) specific for the relevant exchange. For example, the NYSE 16 uses CMS protocol, and TSE 20 uses STAMP protocol. Thus, any information transmitted from the gateway 1 to the NYSE 16 must be in CMS protocol, while any information transmitted from the gateway 1 to the TSE 20 must be in STAMP protocol.

The gateway 1 serves as the link or interface between the customer systems 2, 4 and/or broker system(s) 6, and the exchanges 16, 18, 20, 22.

Figure 2:
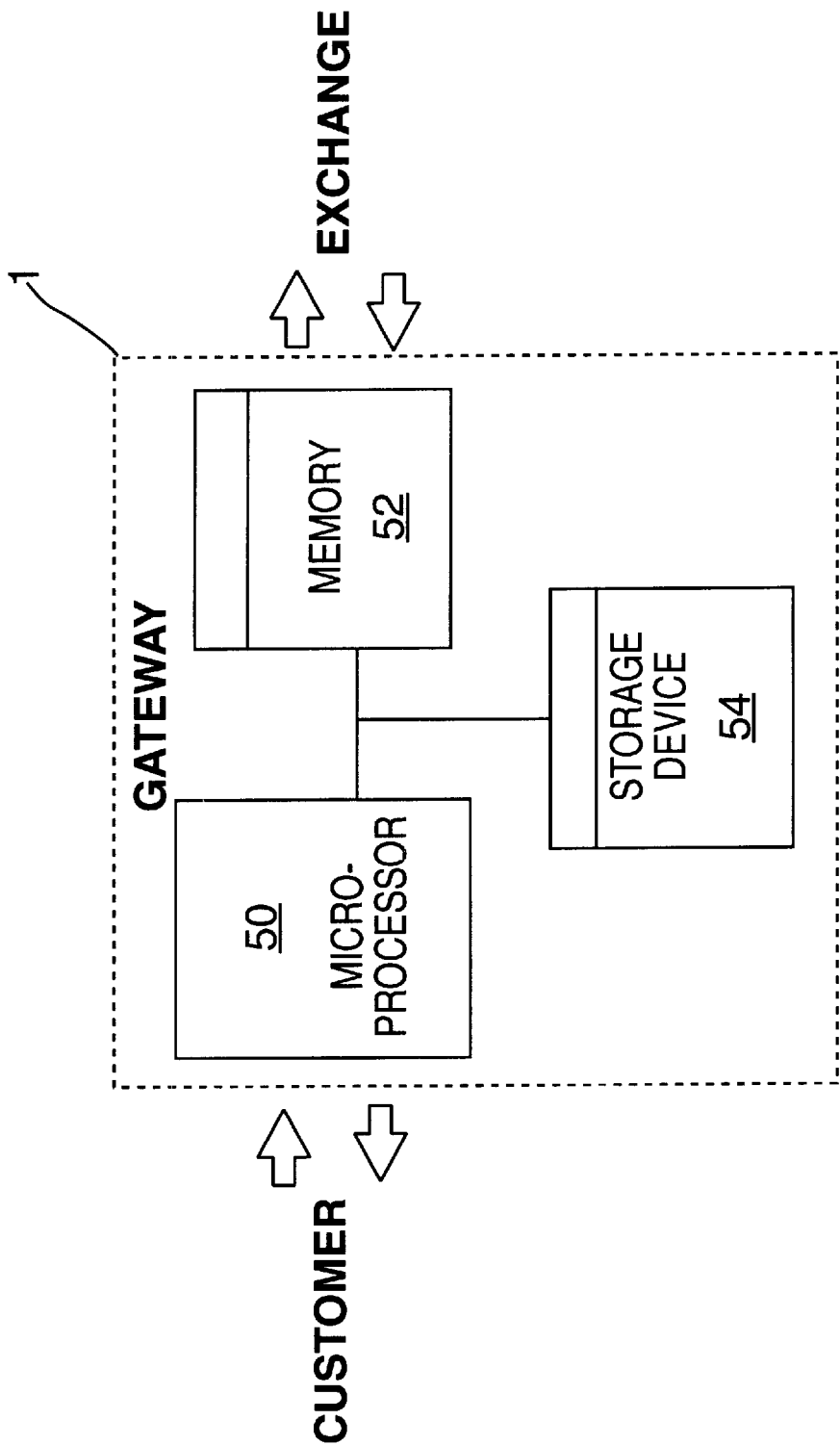
FIG. 2 is a system block diagram showing the internal structure of the gateway according to a preferred embodiment of the present invention.

Referring now to FIG. 2, there is shown a block diagram of the internal structure of the gateway 1 according to a first embodiment of the present invention. The gateway 1 includes a processor 50, which may be, for example, a microprocessor, a microprocessor array, or a microcomputer.

The processor 50 is coupled to a memory 52, for example a RAM, which is used to store information received from the customer system(s) 2, 4 and/or broker system(s), and from the exchanges 16, 18, 20, 22. The information stored in the memory 52 may include, for example, transaction information, information relating to an order placed by a customer or broker, e.g., stock symbol, quantity, price, exchange, etc., acknowledgment information, and confirmation information. The information stored in memory 52 may be stored, for example, in or as a data base or in any format desired.

The gateway 1 may also include a storage device 54, for example, a RAM, a hard drive, tape drive, ZIP drive, optical drive, holographic storage device, or any other type of storage device, coupled to the processor 50. The storage device 54 may be internal to or physically located within the gateway system or may housed at a remote location. Alternatively, the memory 52 and the storage device 54 may be comprised of a single device. The storage device 54 may be used to store, for example, transaction information, information relating to an order placed by a customer or broker, e.g., financial instrument symbol, quantity, price, exchange, etc., acknowledgment information, and confirmation information. The storage device 54 may be used, for example, as a backup for the memory 52 and/or to archive historical information.

Referring now to FIG. 3, there is shown a diagram of a format for tracking data stored in memory 52 as or in a data base according to a first embodiment of the present invention. The tracking data data base may include a number of lists or fields of information relating to the transactions transmitted to the gateway 1 by a customer system. Column 70 includes a list of the transaction number for each transaction transmitted to the gateway 1. Column 72 includes a list of the symbols for the financial instruments comprising each transaction. Column 74 includes a list of the type of transaction to be implemented, i.e., buy, sell, sell short, etc. Column 76 includes a list of the quantity of the respective financial instrument to be traded. Column 78 includes a list of the price at which the financial instrument should be traded. Column 80 includes a list of the exchange on which the relevant financial instrument is listed. Column 82 includes a list indicating for each transaction whether an acknowledgment has been received. Column 84 includes a list indicating for each transaction whether a confirmation has been received. Column 86 includes a list indicating status of the order, i.e., rejected, accepted, filled, partially filled, etc. Column 88 includes a list indicating the quantity of the financial instrument traded for each transaction. Column 90 includes a list indicating the number of financial instruments outstanding or remaining for each requested transaction. Column 92 includes a list indicating the price at which each unit was traded.

Alternatively, the data base may include fewer or more columns than those indicated and various columns may be combined or divided as desired. Additionally, the information may be stored in some other manner besides as a data base, including but not limited to being coded, stored as a data word, as compressed data, etc.

The data rates at the customer/gateway interfaces 8, 10 and/or 12 (as shown in FIG. 1) are approximately the same since they use a common protocol. The data rate between customer system(s) 2, 4 and/or broker system(s) 6, and the gateway 1 can be, for example, 56 Kbps. Alternatively, the data rates at customer/gateway interfaces 8, 10 and/or 12 may vary. The data rates between the gateway 1 and the exchanges at exchange/gateway interface 24, 26, 28, 30 may be similar or may vary, and can be, for example, 9600 bps. Whatever data rates are used, the memory 52 should be of sufficient capacity to store all received information without losing or over-writing any data.

Because of the differences in data rates between the customer/gateway interfaces and the exchange/gateway interface, the memory 52 may also be used as a buffer to store any transaction information that may accumulate while waiting to be transmitted to the exchanges, or to customers/brokers. Alternatively, a separate memory may be used to buffer this transaction information.

Communications between the gateway 1 and customer system(s) 2, 4 and broker system(s) 6 may also include some form of security such as, for example, coding of information, time offsets and password protection, to insure the integrity and secrecy of the information being transmitted.

The gateway 1 processes information, for example, by using one or more programs running one or more threads of execution (i.e., sharing resources) or by using multiple programs, such that multiple pieces of information may be processed at the same time. The gateway 1 is, therefore, able to communicate with multiple customer system(s) 2, 4 and/or broker system(s) 6, and with multiple exchanges 16, 18, 20, 22 simultaneously. Each customer system and/or broker system that transmits information, i.e., an order, to the gateway 1 is allocated a separate thread, i.e., a separate flag is set, and a separate program is invoked to process the information from that customer system and/or broker system.

Figure 4:
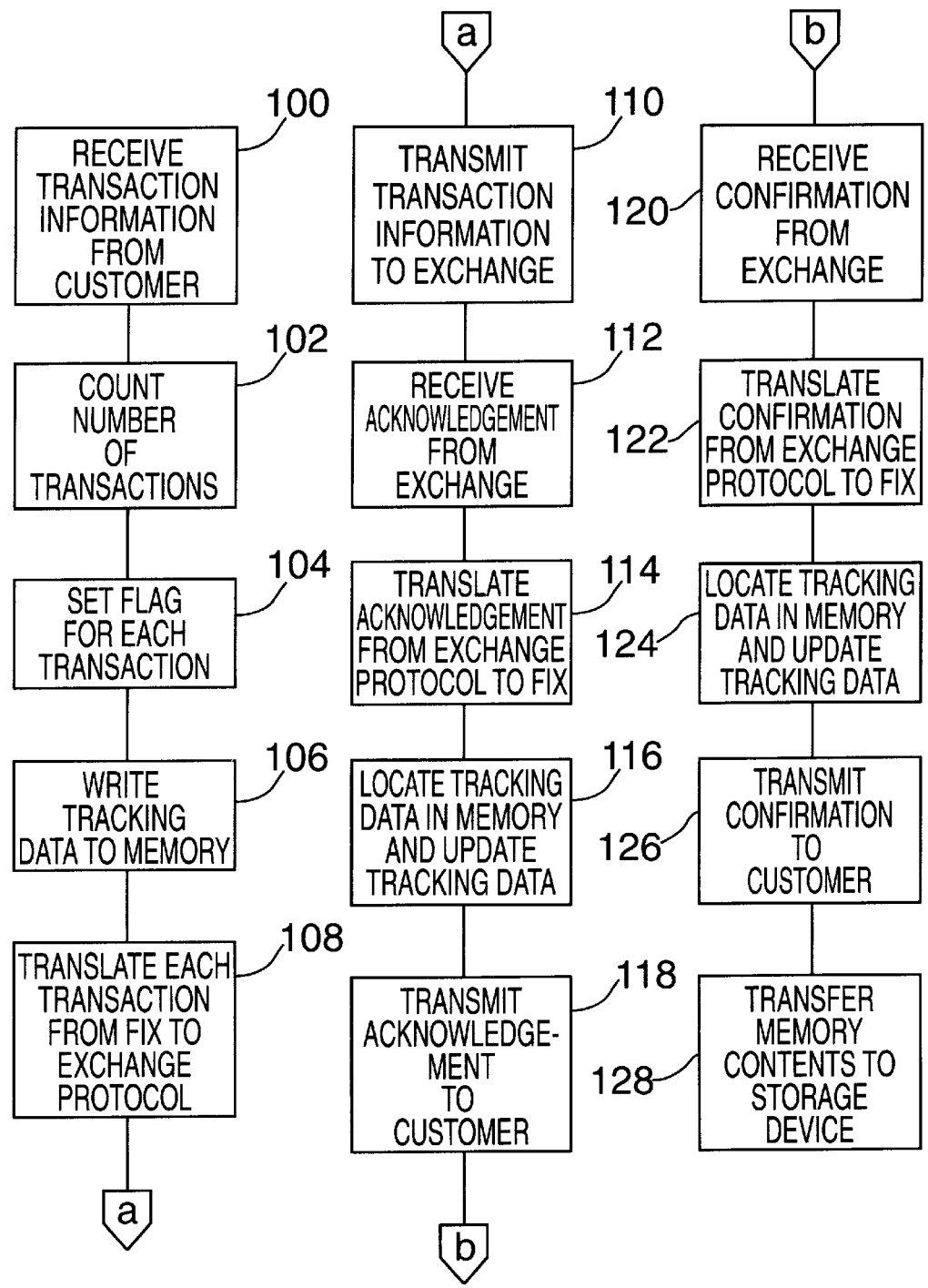
FIG. 4 is a flow diagram showing the operation of the gateway according to a first embodiment of the present invention.

The operation of the gateway, including processing of information can be understood more readily by referring to FIG. 4, which is a flow diagram of the gateway operation according to a first embodiment of the present invention. In step 100 transaction information, e.g., an order, is received from a customer system 2 by the gateway 1 in an common protocol such as, for example, FIX protocol. The order is processed in steps 102, 104, 106 and 108. Because an order may include one or more transactions such as, for example, buying and/or selling equities, buying and/or selling futures, buying and/or selling bonds, buying and/or selling options, etc., the processing should include a counting step 102 where the number of transactions is determined. The processing also includes a step 104 where flags are set for each separate transaction. There may be an additional step (not shown) where the information is provided with some form of coding or identification so that the processor can identify and match the information transmitted to the exchange system (i.e., transaction information) with the information received from the exchange system (i.e., acknowledgment and confirmation information).

The processing further includes a step 106 where tracking data relating to each transaction is written to a location, for example, in memory 52 so that the gateway may keep track of each transaction. The tracking data may be written, for example, in the form of a data base, and may include information such as, for example, described above in relation to FIG. 3. Each transaction is then translated in step 108 from FIX protocol into the proper protocol for the exchange to which it is to be transmitted.

For example, if the gateway 1 receives an order from a customer system 2 containing three transactions (as shown in FIG. 3), i.e., (1) purchase 100,000 shares of XYZ stock on the NYSE at $17/share, (2) sell 200,000 shares of ABC stock on the TSE at $42/share, and (3) buy 1000 July put options for LMN stock at last asking price, the gateway 1 will count the number of transactions and set flags for each, i.e., three flags. The gateway 1 will also write tracking data relating to each of the three transactions into memory. The gateway 1 will then begin translating the first transaction from FIX protocol into CMS protocol, the second transaction from FIX protocol into STAMP protocol, and the third transaction from FIX protocol into the proper protocol for the relevant options exchange.

The gateway 1 may run a separate sub-program for processing (including translation) for each customer, or may otherwise process transactions for each customer individually. The processing of transactions for each customer may occur simultaneously or consecutively since the gateway 1 is capable of parallel processing, i.e., processing for each customer simultaneously.

Alternatively, the processing may include only some of the steps discussed above or it may include additional steps such as, for example, error correction, data compression, etc.

When the processing of a transaction received from a customer system is completed, in step 110 the gateway 1 transmits the translated (reformatted) transaction information to the proper exchange. The gateway 1 then receives an acknowledgment from the exchange, in step 112, indicating that the transaction information has been received. The gateway processes the acknowledgment in steps 114, 116 and 118. In step 114 the gateway 1 translates the acknowledgment from the exchange's protocol into a common protocol such as, for example, FIX protocol. In step 116 the gateway locates the tracking data in memory 52 relating to the relevant transaction and updates the tracking data in memory 52. In step 118 the gateway 1 transmits the acknowledgment information to the customer system 2.

Some time after the acknowledgment is received by the gateway 1, in step 120 the gateway 1 receives a transaction confirmation from the relevant exchange. The transaction confirmation indicates the status of the transaction and may include information such as, for example, financial instrument symbol, order accepted and filled/partially filled or rejected, quantity, price, etc.

The gateway processes the transaction confirmation in steps 122, 124 and 126. In step 122 the gateway 1 translates the transaction confirmation from the exchange's protocol into a common protocol such as, for example, FIX protocol. In step 124 the gateway locates the tracking data in memory 52 relating to the relevant transaction and updates the tracking data in memory 52. In step 126 the gateway 1 transmits the transaction confirmation to the customer system 2.

In step 128 the gateway transfers the contents of memory 52 relating to transactions for which transaction confirmations have been received into storage device 54. The storage device 54 may be accessed by the customer system(s) 2, 4 and the broker system(s) 6, and by the broker. Safety features in the gateway 1 only allow a customer system/broker system access to the transactions placed by that customer system/broker system.

The system can accommodate and support any number of customers and/or brokers as well as any number of financial markets (exchanges).

What is claimed is:

1. A device for providing an information gateway between a customer and a financial market comprising:
   a processor coupled to a customer system, and coupled to a financial market system, the processor programmed to:
   receive a first group of data from the customer system,
   receive a second group of data from the financial market system,
   convert the first group of data into a third group of data,
   convert the second group of data into a fourth group of data,
   transmit the third group of data to the financial market system, and
   transmit the fourth group of data to the customer system; and
   a memory coupled to the processor, the processor programmed to transmit a fifth group of data to the memory.

2. The device according to claim 1, wherein the fifth group of data relates to the first group of data and to the fourth group of data.

3. The device according to claim 1, further comprising a storage device coupled to the processor, the processor programmed to transmit the fifth group of data to the storage device.

4. The device according to claim 1, wherein the first and fourth group of data are in a first format.

5. The device according to claim 1, wherein the second and third group of data are in a second format.

6. The device according to claim 4, wherein the first format is FIX protocol.

7. The device according to claim 1, wherein the first group of data, the second group of data, the third group of data and the fourth group of data are received and transmitted electronically.

8. The device according to claim 1, wherein the first group of data, the second group of data, the third group of data and the fourth group of data are received and transmitted optically.

9. The device according to claim 1, wherein the first group of data and the fourth group of data include transaction information.

10. The device according to claim 9, wherein the transaction information includes information relating to a plurality of transactions.

11. The device according to claim 1, wherein the second group of data and the third group of data include at least one of acknowledgment information and confirmation information.

12. The device according to claim 1, wherein the processor is coupled to a plurality of customer systems and the processor programmed to receive at least one first group of data from each of the plurality of customer systems, and wherein each of the at least one first groups of data are in the first format.

13. The device according to claim 1, wherein the fifth group of data is stored in memory in a data base.

14. The device according to claim 1, wherein the fifth group of data includes tracking information.

15. A device for providing an information gateway between at least one customer and a plurality of financial markets comprising:
    a processor coupled to at least one customer system, and coupled to a plurality of financial market systems, the processor programmed to:
    receive at least one first group of data from the at least one customer system,
    receive at least one second group of data from at least one of the plurality of financial market systems,
    convert the at least one first group of data into at least one third group of data,
    convert the at least one second group of data into at least one fourth group of data,
    transmit the at least one third group of data to at least one of the plurality of financial market systems, and transmit the at least one fourth group of data to the at least one customer system; and a memory coupled to the processor, the processor programmed to transmit at least one fifth group of data to the memory.

16. The device according to claim 15, further comprising a storage device coupled to the processor, the processor programmed to transmit the at least one fifth group of data to the storage device.

17. The device according to claim 15, wherein the processor is coupled to a plurality of customer systems and the processor programmed to receive at least one first group of data from each of the plurality of customer systems, and wherein each of the at least one first groups of data are in the first format.

18. A device for providing an information gateway comprising:

a processor coupled to at least one first system, and coupled to at least one second system, the processor programmed to:
  receive at least one first group of data from the at least one first system in a first format,
  receive at least one second group of data from the at least one second system in a second format,
  convert the at least one first group of data from the first format into the second format,
  convert the at least one second group of data from the second format into the first format,
  transmit the at least one first group of data to the at least one second system in the second format,
  transmit the at least one second group of data to the at least one first system in the first format.

19. The device according to claim 18, further comprising a memory coupled to the processor, the processor programmed to transmit at least one third group of data to the memory.

20. The device according to claim 19, wherein the third group of data relates to the first group of data and to the second group of data.

21. The device according to claim 19, wherein the third group of data is stored in memory in a data base.

22. The device according to claim 19, wherein the third group of data includes tracking information.

23. The device according to claim 18, further comprising a storage device coupled to the processor, the processor programmed to transmit the third group of data to the storage device.

24. The device according to claim 23, wherein the storage device is a tape drive.

25. The device according to claim 18, wherein the first protocol is FIX protocol.

26. The device according to claim 18, wherein the at least one first group of data and the at least one second group of data are received and transmitted electronically.

27. The device according to claim 18, wherein the at least one first group of data and the at least one second group of data are received and transmitted optically.

28. The device according to claim 18, wherein the at least one first group of data includes transaction information.

29. The device according to claim 26, wherein the first group of data includes information relating to a plurality of transactions.

30. The device according to claim 18, wherein the at least one second group of data includes at least one of acknowledgment information and confirmation information.

31. The device according to claim 18, wherein the processor is coupled to a plurality of first systems and a plurality of second systems, and the processor programmed to receive at least one first group of data from each of the plurality of first systems, and wherein each of the at least one first groups of data are in the first format (protocol).

32. The device according to claim 18, wherein the at least one first system is a customer system and the at least one second system is a financial market system.

33. A method for providing an information gateway between a customer and a financial market comprising the steps of:

receiving a first group of data from a customer system;

receiving a second group of data from a financial market system;

converting the first group of data into a third group of data;

converting the second group of data into a fourth group of data;

transmitting the third group of data to the financial market system;

transmitting the fourth group of data to the customer system;

transmitting a fifth group of data to a memory.

34. The method according to claim 33, wherein the fifth group of data relates to the first group of data and to the fourth group of data.

35. The method according to claim 33, further comprising a storage device coupled to the processor, the processor programmed to transmit the fifth group of data to the storage device.

36. The method according to claim 33, wherein the first and fourth group of data are in a first format.

37. The method according to claim 33, wherein the second and third group of data are in a second format.

38. The method according to claim 36, wherein the first format is FIX protocol.

39. The method according to claim 33, wherein the first group of data, the second group of data, the third group of data and the fourth group of data are received and transmitted electronically.

40. The method according to claim 33, wherein the first group of data, the second group of data, the third group of data and the fourth group of data are received and transmitted optically.

41. The method according to claim 33, wherein the first group of data and the fourth group of data include transaction information.

42. The method according to claim 41, wherein the transaction information includes information relating to a plurality of transactions.

43. The method according to claim 33, wherein the second group of data and the third group of data include at least one of acknowledgment information and confirmation information.

44. The method according to claim 33, wherein a first group of data is received from each of a plurality of customer systems, and a second group of data is received from each of a plurality of financial market system.

45. The method according to claim 33, wherein the fifth group of data is stored in memory in a data base.

46. The method according to claim 33, wherein the fifth group of data includes tracking information.

47. A method for providing an information gateway between at least one customer and a plurality of financial markets comprising the steps of:

receiving at least one first group of data from at least one customer system in a first format;

receiving at least one second group of data from at least one of a plurality of financial market systems in a second format;

converting the at least one first group of data from the first format into the second format;

converting the at least one second group of data from the second format into the first format;

transmitting the at least one first group of data to at least one of the plurality of financial market systems in the second format;

transmitting the at least one second group of data to the at least one customer system in the first format; and transmitting at least one third group of data to a memory.

48. The method according to claim 47, further comprising a storage device coupled to the processor, the processor programmed to transmit the at least one fifth group of data to the storage device.

49. The method according to claim 47, wherein a first group of data is received from each of a plurality of customer systems in the first format.

50. A method for providing an information gateway comprising the steps of:

receiving at least one first group of data from at least one first system in a first format;

receiving at least one second group of data from at least one second system in a second format;

converting the at least one first group of data from the first format into the second format;

converting the at least one second group of data from the second format into the first format;

transmitting the at least one first group of data to the at least one second system in the second format; and transmitting the at least one second group of data to the at least one first system in the first format.

51. The method according to claim 50, further comprising the step of transmitting at least one third group of data to a memory.

52. The method according to claim 51, wherein the third group of data relates to the first group of data and to the second group of data.

53. The method according to claim 51, wherein the third group of data is stored in memory in a data base.

54. The method according to claim 51, wherein the third group of data includes tracking information.

55. The method according to claim 50, further comprising a storage device coupled to the processor, the processor programmed to transmit a third group of data to the storage device.

56. The method according to claim 55, wherein the storage device is a tape drive.

57. The method according to claim 50, wherein the first protocol is FIX protocol.

58. The method according to claim 50, wherein the at least one first group of data and the at least one second group of data are received and transmitted electronically.

59. The method according to claim 50, wherein the at least one first group of data and the at least one second group of data are received and transmitted optically.

60. The method according to claim 50, wherein the at least one first group of data includes transaction information.

61. The method according to claim 60, wherein the first group of data includes information relating to a plurality of transactions.

62. The method according to claim 50, wherein the at least one second group of data includes at least one of acknowledgment information and confirmation information.

63. The method according to claim 50, wherein a first group of data is received from each of a plurality of first systems, and a second group of data is received from each of a plurality of second systems.

64. The method according to claim 50, wherein the at least one first system is a customer system and the at least one second system is a financial market system.

* * * * *